(12) United States Patent
Mann

(10) Patent No.: US 8,371,601 B2
(45) Date of Patent: Feb. 12, 2013

(54) FIFTH WHEEL SLIDE ASSEMBLY SECONDARY LOCK

(75) Inventor: Steven W. Mann, Gardendale, AL (US)

(73) Assignee: Fontaine Fifth Wheel, Trussville, AL (US)

( * ) Notice: Subject to any disclaimer, the term of this patent is extended or adjusted under 35 U.S.C. 154(b) by 0 days.

(21) Appl. No.: 13/469,980

(22) Filed: May 11, 2012

(65) Prior Publication Data

US 2012/0286495 A1 Nov. 15, 2012

Related U.S. Application Data

(60) Provisional application No. 61/484,717, filed on May 11, 2011.

(51) Int. Cl.
*B62D 53/08* (2006.01)
(52) U.S. Cl. ........................................ 280/433; 280/441
(58) Field of Classification Search .................. 280/407, 280/433, 434, 438.1, 441, 441.1, 407.1, 901; 297/143, 341, 344.1
See application file for complete search history.

(56) References Cited

U.S. PATENT DOCUMENTS

| | | | | |
|---|---|---|---|---|
| 3,606,384 A | * | 9/1971 | Fontaine et al. | 280/407 |
| 3,893,710 A | * | 7/1975 | Madura | 280/407 |
| 5,344,173 A | * | 9/1994 | Beeler et al. | 280/438.1 |
| 5,915,713 A | * | 6/1999 | Kniep | 280/441 |
| 7,717,451 B2 | * | 5/2010 | Alguera | 280/438.1 |
| 7,874,569 B2 | * | 1/2011 | Schmidt et al. | 280/438.1 |
| 2003/0001361 A1 | * | 1/2003 | Laarman et al. | 280/433 |
| 2006/0202443 A1 | * | 9/2006 | Sibley et al. | 280/441 |
| 2010/0148470 A1 | * | 6/2010 | Mann et al. | 280/438.1 |

* cited by examiner

*Primary Examiner* — Tashiana Adams
(74) *Attorney, Agent, or Firm* — R. Blake Johnston, Esq.; DLA Piper US LLP

(57) ABSTRACT

A fifth wheel slide assembly secondary lock includes an elongated cam member supported by a spindle extending upward from a sliding pedestal. A pair of linkage bars are pivotally coupled by one end to opposing ends of the cam member, the other ends of the bars being coupled to wedges operable for selectively engaging slide rails mounted to a vehicle frame in order to maintain a longitudinal position of said pedestal. The pedestal includes at least one stop extending upward from the pedestal at a height that extends above an arc defined by the rotation of the cam.

4 Claims, 5 Drawing Sheets

FIFTH WHEEL SLIDE ASSEMBLY SECONDARY LOCK

CROSS-REFERENCE TO RELATED APPLICATIONS

This application claims priority to U.S. Provisional App. Ser. No. 61/484,717, filed May 11, 2011.

BACKGROUND

1. Field

The present invention relates generally to fifth wheel adjusting slide assemblies, and in particular to fifth wheel adjusting slide assemblies with a secondary lock.

2. Description of Related Art

Many current fifth wheel adjusting slide assemblies use selection wedges that engage opposing, laterally spaced slide rails to hold the fifth wheel's longitudinal position relative to the slide rail. The wedges are typically held in place in the slide rail by spring force. If the spring becomes dislodged, or fails, the wedges could disengage from the slide rails, and the fifth wheel would slide freely within the slide assembly. If the fifth wheel was coupled to a trailer, the results would be dangerous and catastrophic.

SUMMARY

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

A fifth wheel slide assembly secondary lock includes an elongated cam member supported by a spindle extending upward from a sliding pedestal. A pair of linkage bars are pivotally coupled by one end to opposing ends of the cam member, the other ends of the bars being coupled to wedges operable for selectively engaging slide rails mounted to a vehicle frame in order to maintain a longitudinal position of said pedestal. The pedestal includes at least one stop extending upward from the pedestal at a height that extends above an arc defined by the rotation of the cam.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

The various embodiments of the present invention and their advantages are best understood by referring to FIGS. 1 through 7 of the drawings. The elements of the drawings are not necessarily to scale, emphasis instead being placed upon clearly illustrating the principles of the invention. Throughout the drawings, like numerals are used for like and corresponding parts of the various drawings.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

Furthermore, reference in the specification to "an embodiment," "one embodiment," "various embodiments," or any variant thereof means that a particular feature or aspect of the invention described in conjunction with the particular embodiment is included in at least one embodiment of the present invention. Thus, the appearance of the phrases "in one embodiment," "in another embodiment," or variations thereof in various places throughout the specification are not necessarily all referring to its respective embodiment.

Terms such as "aft," "rear," "forward," "front," "lateral," or "outward," or the like, and derivatives thereof are to be understand in relation to the truck or vehicle on which the fifth wheel is mounted. On the other hand, rotational terms such as "clockwise" and "counter-clockwise" are to be understood as viewed in the figure(s) referenced in the detailed description. However, it is to be understood that the invention may assume various alternative orientations, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
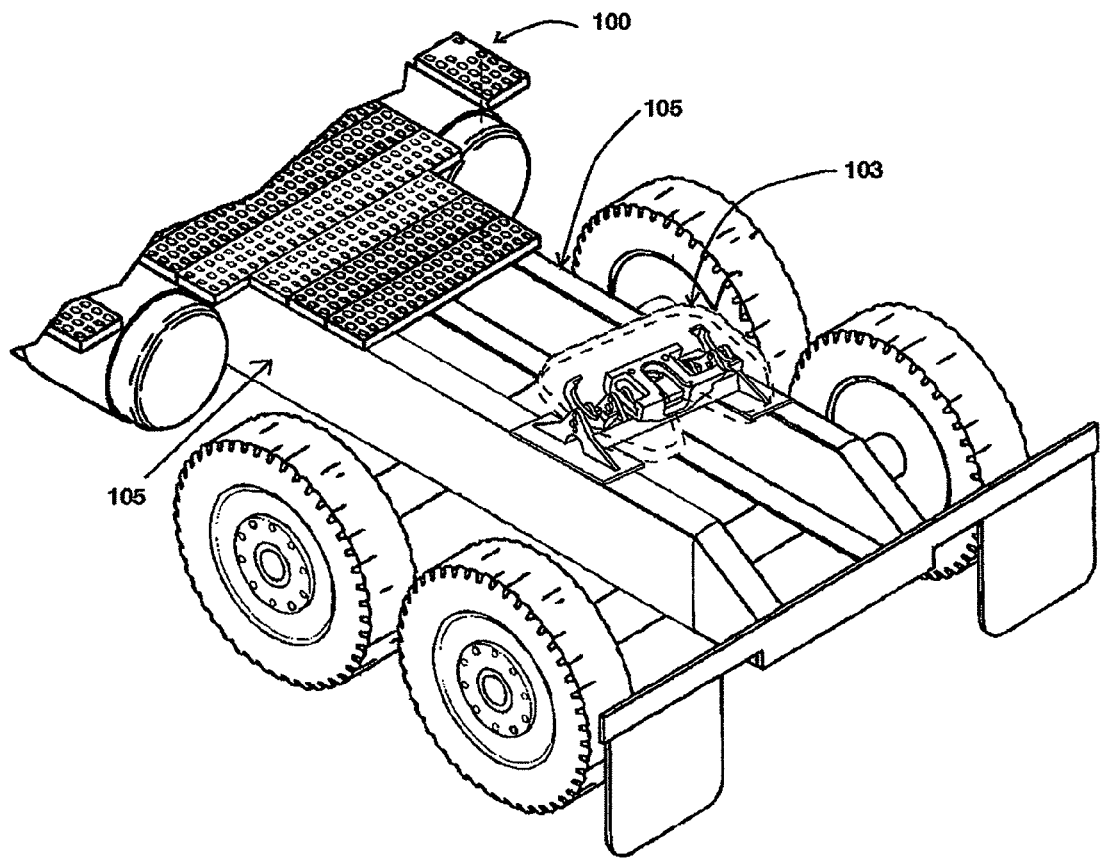
FIG. 1 is an exemplary tractor truck with an exemplary fifth wheel hitch attached to adjacent truck frames.
Figure 1A:
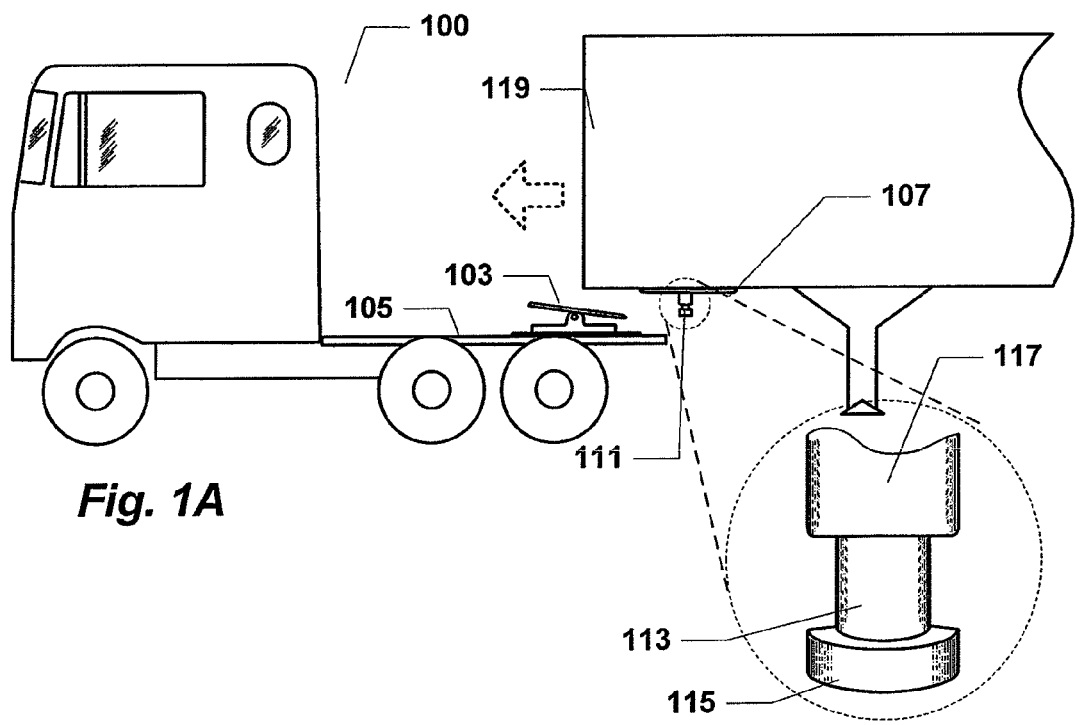
FIG. 1A is elevational view of an exemplary tractor truck and trailer with a fifth wheel hitch.
Figure 1B:
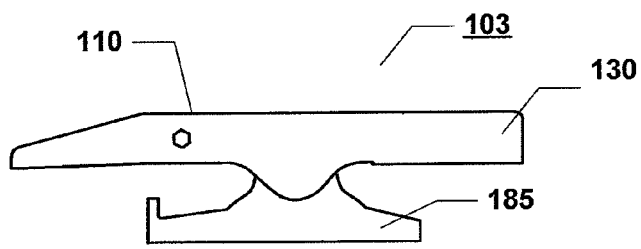
FIG. 1B is an exemplary fifth wheel hitch.
Figure 1C:
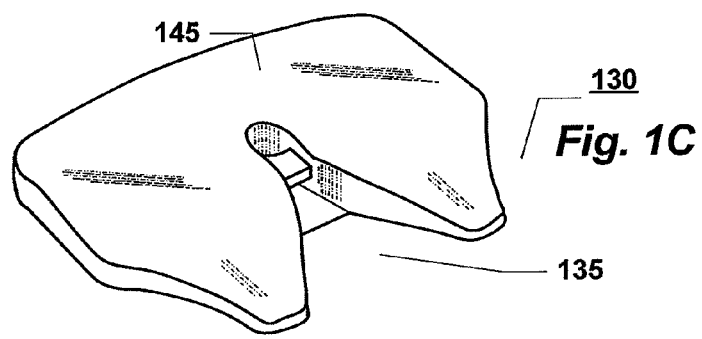
FIG. 1C is an exemplary hitch plate.

Fifth wheel hitches are well known in the field of towing trailers using a truck or tractor. FIG. 1 depicts an exemplary tractor and trailer hitch arrangement employing a fifth wheel hitch 103. Tractor 100 is affixed with a fifth wheel hitch 103 to rear of parallel tractor frame members 105. FIGS. 1A through 1C depict another view of an exemplary tractor and trailer hitch arrangement employing a fifth wheel hitch. Tractor 100 is affixed with a fifth wheel hitch 103 positioned rearward on the tractor frame 105. Fifth wheel hitch 103 includes a fifth wheel hitch assembly 110 pivotally mounted on slide assembly 155. Fifth wheel hitch assembly 110 comprises hitch plate 130 which houses a locking mechanism underneath with slot 135 opening toward the aft end of fifth wheel assembly 110 for receiving a kingpin 111 from trailer 119.

Kingpin 111 typically extends downward from a trailer bearing plate 107, which rests upon fifth wheel assembly, specifically, upon load area 145 of fifth wheel hitch plate 130. Kingpin is, typically, a unitarily constructed article comprised of a lower flange 115 capping a shank 113 which extends from collar 117.

Figure 1D:
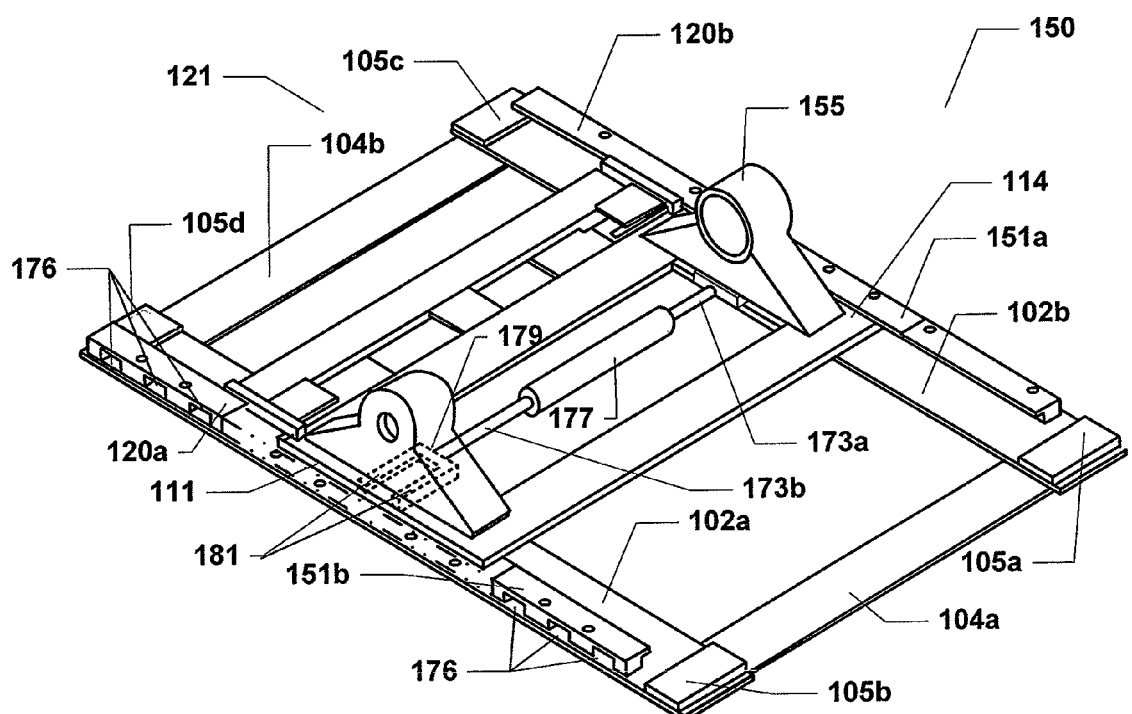
FIG. 1D is an exemplary prior art fifth wheel slide rail assembly.

FIG. 1D depicts an example of a conventional slide rail where slide rail assembly 120a is comprised of left and right slide rail plates 102a, b tied in parallel by two or more tie bars 104a, b which form slide frame 121. Left slide rail 151b is attached to the upper surface of left slide rail plate 102a and right slide rail 151a is attached to upper surface of right slide rail plate 102b such that fifth wheel hitch assembly 110 and slide assembly 155 are located therebetween, inboard of the left and right slide rails 102a, b. Slide rail plates 102a, b and slide rails 151a, b each have longitudinal axes which parallel the longitudinal axis of tractor 109 and are typically mounted, either with welding or fastening, to parallel longitudinal truck frame members (not shown), usually with using interposing angle iron members.

Slide stop blocks 105a-d are located at each end of each slide rail plate 102a, b. Slide stop blocks 105a-d prevent over travel of slide assembly 155. As is shown in the illustration, slide rails 151a, b of the prior art are typically a flange extending inboard of the assembly, slidably receiving laterally extending flanges 111, 114 of slide assembly 155. Slide rails 151a, b typically include gaps, or detents, 176 spaced along the length of the slide rail.

The slide assembly 155 may include a means for selectively locking the bracket in position longitudinally with respect to the slide rail assembly. One example, shown in FIG. 1D, is a pneumatic cylinder 177 mounted in the assembly from which laterally extend plunger arms 173a, b. A fork member 179 may be mounted to the respective lateral ends of plunger arms 173, where the fork member includes projections, or prongs, 181 that insert into the slide rail gaps 176 when the plungers arms are extended. The engagement of the projections 181 into the gaps 176, thus, prevents longitudinal movement of the slide assembly 155, and, therefore, the fifth wheel assembly. Slide assembly 155 also comprises brackets 165 which provide attachment support for the hitch assembly 110, configured to allow the hitch assembly to pivot in the longitudinal plane.

Figure 2:
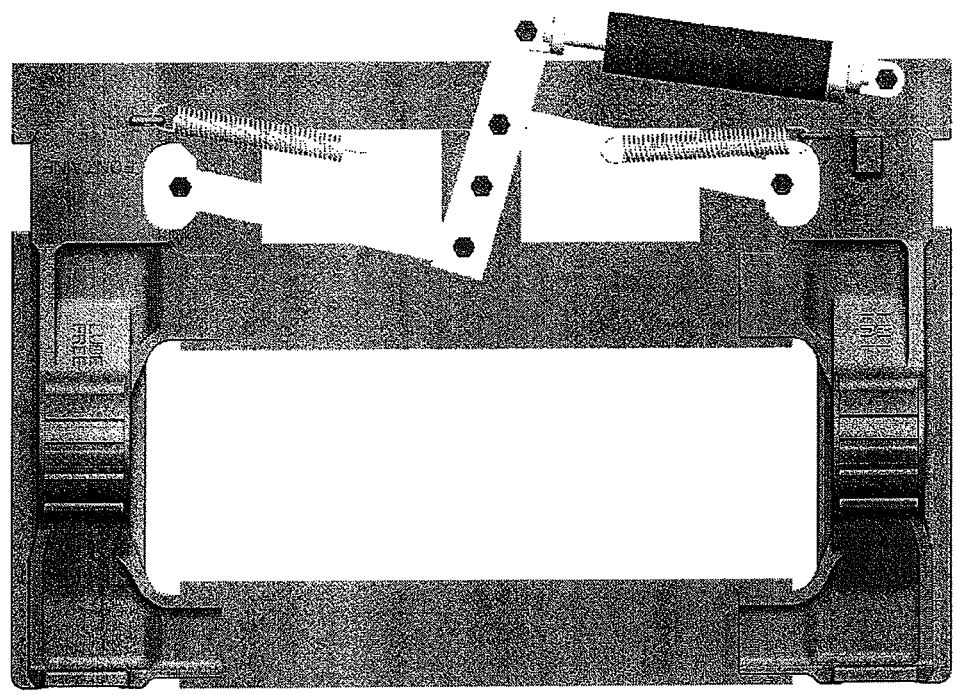
FIG. 2 is a plan view of an exemplary prior art pedestal assembly showing an exemplary locking configuration.
Figure 3:
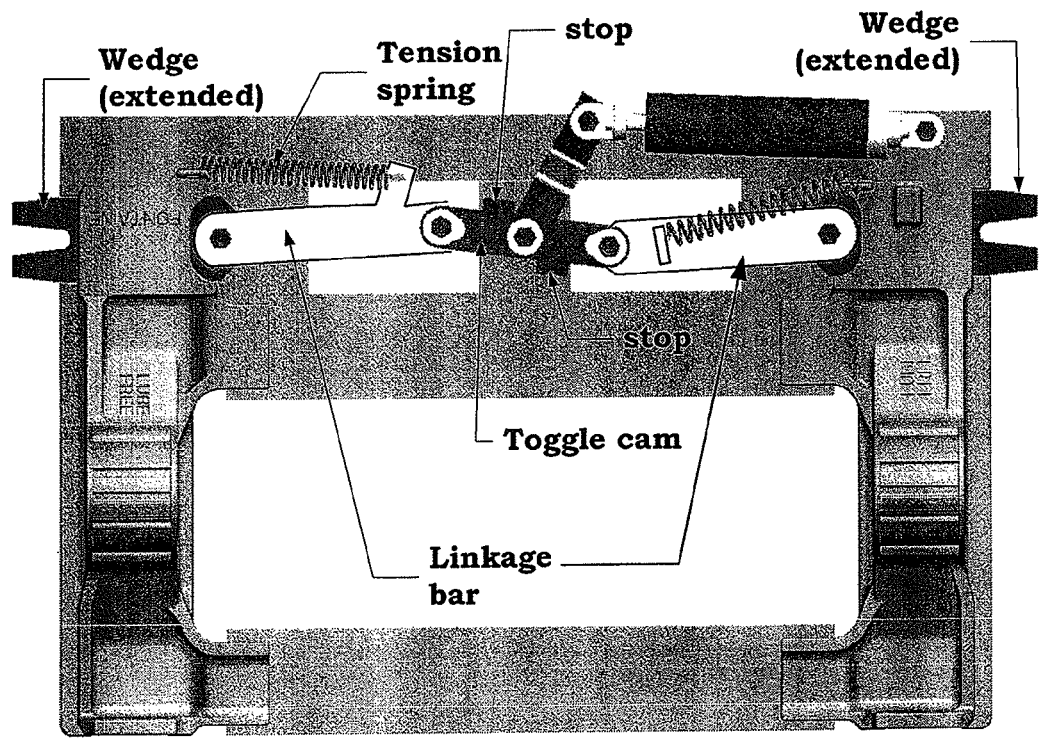
FIG. 3 is a plan view of an exemplary pedestal and locking assembly according to an embodiment of the present invention.
Figure 4:
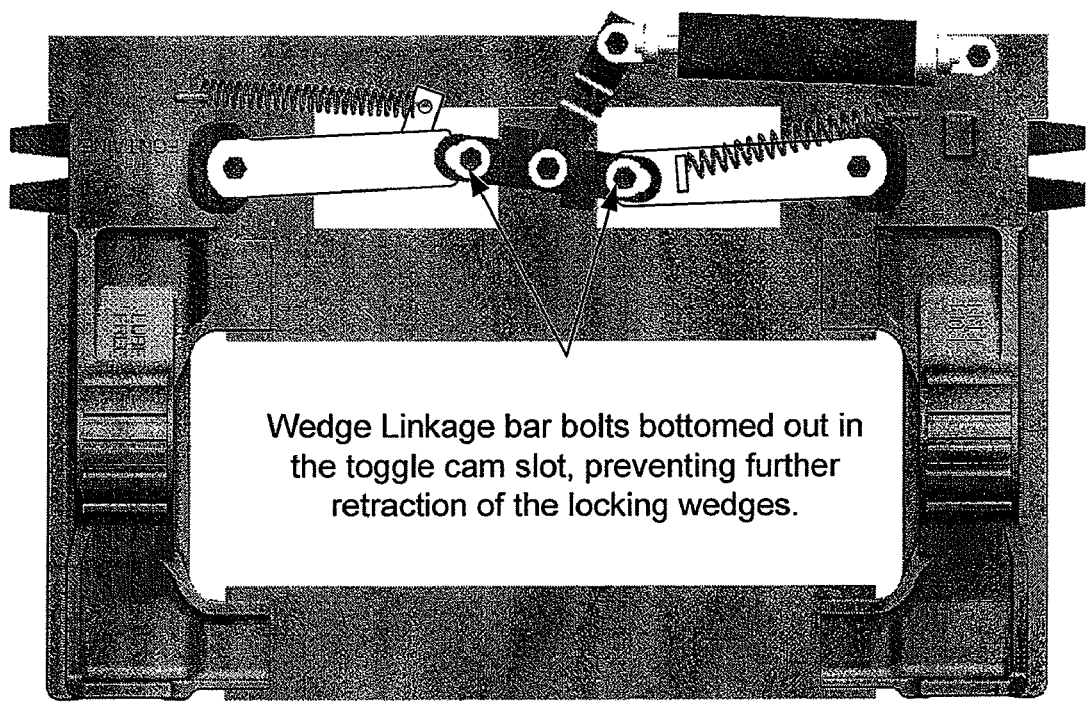
FIG. 4 is another plan of view of the assembly of FIG. 3.
Figure 5:
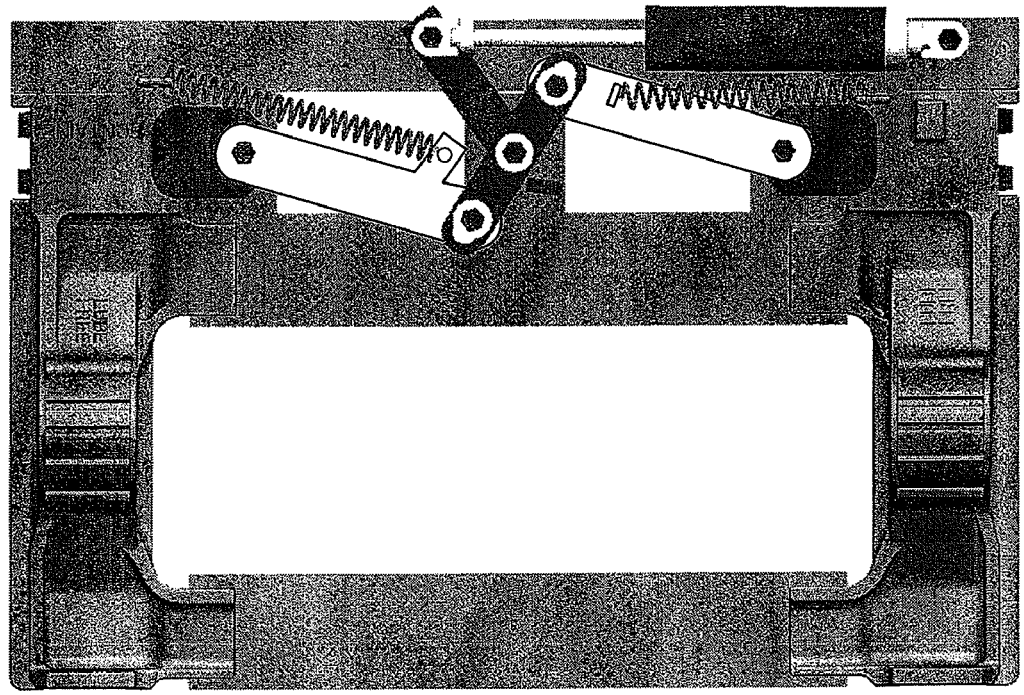
FIG. 5 is a plan view of the assembly of FIG. 3, with the locking wedges retracted.
Figure 6:
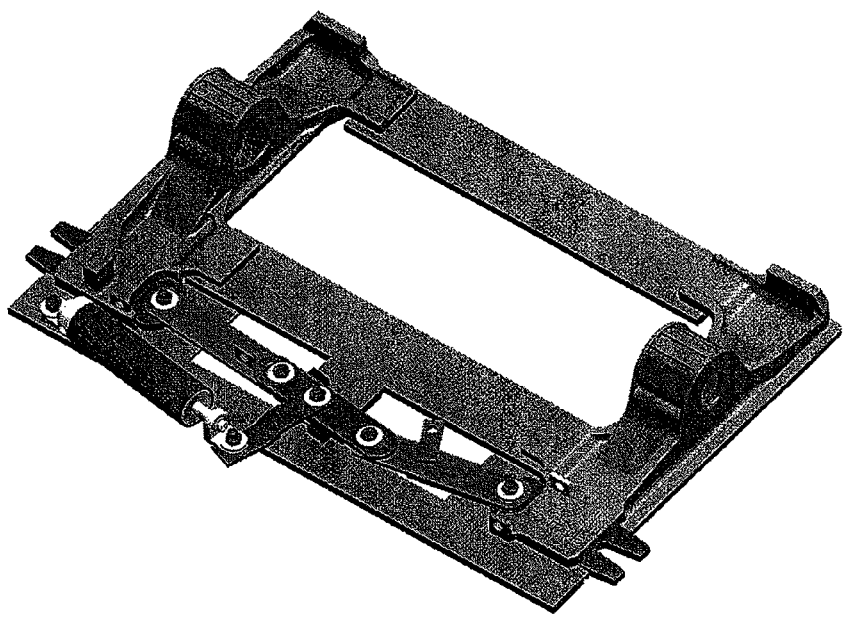
FIG. 6 is a perspective view of the pedestal with locking assembly.
Figure 7:
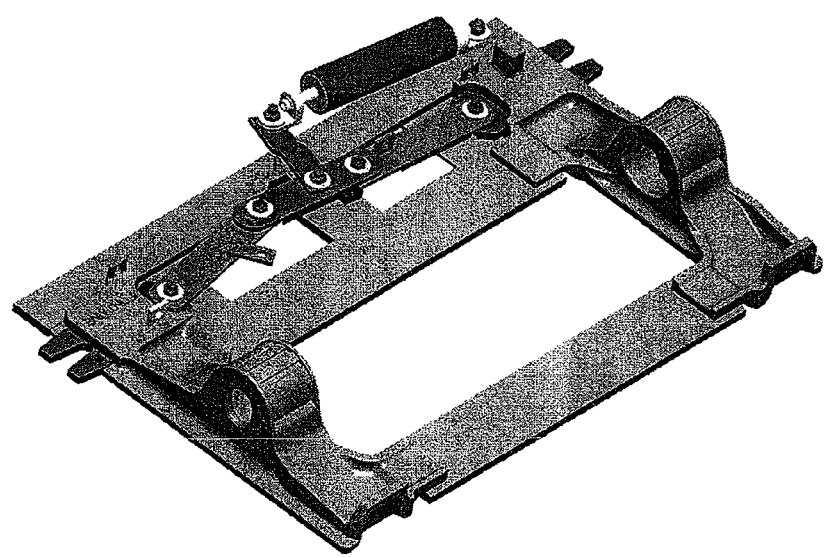
FIG. 7 is another perspective view of the pedestal with locking assembly.

Referring to FIG. 2, another prior art slide assembly is shown with wedges that engage the slide rail and are held in place in the slide rail by spring force. In FIG. 3, a new slide assembly arrangement includes a toggle lock. The wedges in this arrangement are also held in place in the slide rail by spring force, but the added toggle lock acts as a back-up. In the event that the wedges begin to disengage from the slide rail, spring force resists this disengagement. If the retraction force on the wedges exceeds the spring force, the toggle lock prevents the wedges from retracting fully from the rail.

One end of the wedge linkage bar attaches to the wedge through a bolted joint that rotates freely. The other end of the wedge linkage bar attaches to the toggle cam through a slotted joint that allows for both rotation and linear motion. This liner motion is necessary to allow the wedge to seat fully in the slide rail. In the closed position, the toggle cam rotates over center and rests against the toggle cam stops.

As described above and shown in the associated drawings, the present disclosure is drawn to a fifth wheel slide assembly secondary lock. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. In a fifth wheel assembly configured for selective adjustment in longitudinal position relative to a truck body on which the fifth wheel assembly is mounted, the assembly having a pedestal slidably engaging slide rails disposed in parallel to said longitudinal axis of said truck body, a selective adjustment apparatus carried within the pedestal, the selective adjustment apparatus comprising:

an elongated cam member supported by a spindle extending upward from said pedestal, said cam member having first and second ends;

first and second linkage bars each having an end pivotally coupled to said first and second cam member ends and each said linkage bar having laterally extending ends that are each coupled to first and second wedges, respectively, said wedges operable for selectively engaging said slide rails to maintain a longitudinal position of said pedestal with respect to said slide rails; and at least one stop extending upward from said pedestal and having a height such that it extends above an arc defined by the rotation of said cam.

2. The fifth wheel assembly of claim 1, wherein said cam member comprises first and second elongated slots disposed in said first and second ends, respectively, and wherein said first and second linkage bars are coupled to said first and second ends.

3. The fifth wheel assembly of claim 1, further comprising first and second stops extending upward from said pedestal and having a height such that it extends above an arc defined by the rotation of said cam, said first stop disposed longitudinally forward of said spindle, said second stop disposed longitudinally rearward of said spindle.

4. The fifth wheel assembly of claim 3, wherein said cam member comprises first and second elongated slots disposed in said first and second ends, respectively, and wherein said first and second linkage bars are coupled to said first and second ends.

* * * * *